Patented June 8, 1943

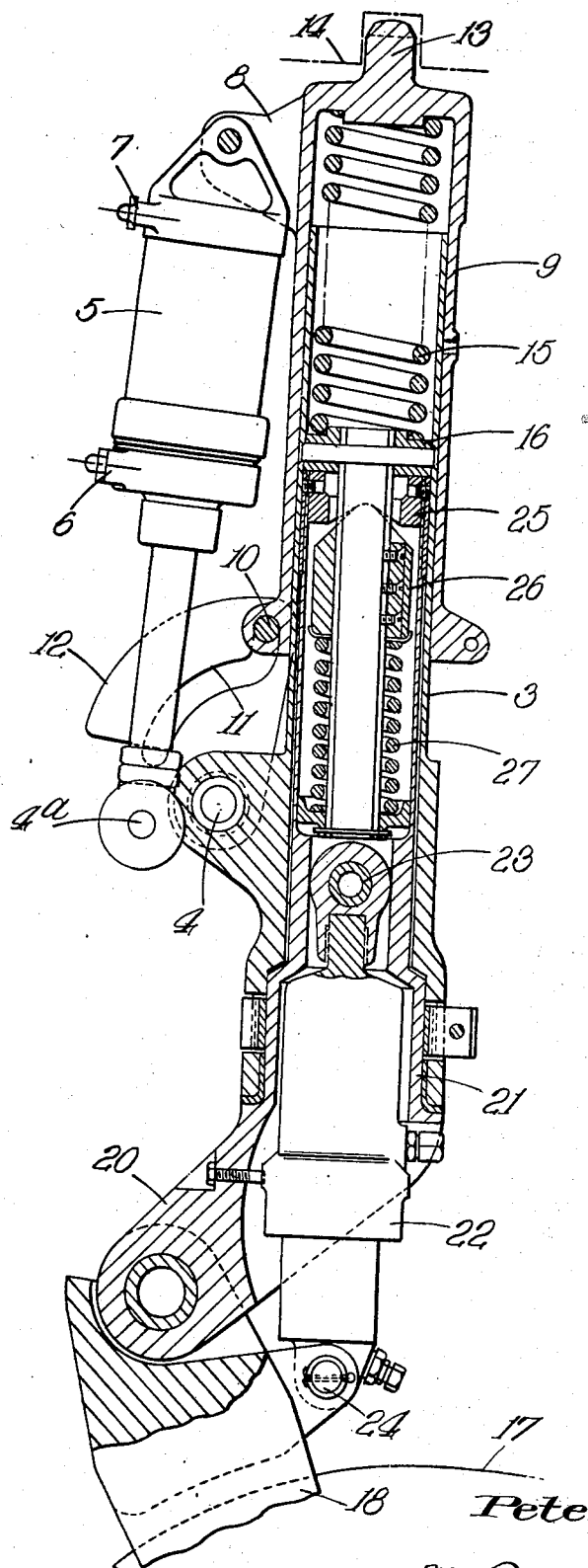

2,321,065

UNITED STATES PATENT OFFICE 2,321,065

MOUNTING FOR AIRCRAFT COMPONENTS

Peter Walter Burke, Cheltenham, England, assignor to Dowty Equipment Limited, Cheltenham, England Application January 29, 1941, Serial No. 377,397
In Great Britain February 1, 1940

12 Claims. (Cl. 244—102)

The present invention is a retraction and extension arrangement for aircraft components and accessories in which energy available in retraction is stored in the retracted condition for use in extension.

Although of more general application, the invention has a particular embodiment in aircraft undercarriage gear.

It is an object of the invention to provide a retraction and extension scheme in various forms embodying automatic extension means in a simple and practical manner.

Another object of the invention is to provide a retraction and extension scheme in which extension operation does not rely on operation of a fluid actuated jack or equivalent remotely controlled element, but rather is accomplished by a spring or the like which has been loaded during retraction.

In the accompanying drawing, forming part of this specification, and in which like reference numerals are employed to designate like parts throughout the same:

The figure is a side elevation, mainly in section, illustrating one aspect of the invention as applied to a tail landing element mounting.

The unit includes a main pillar 3 and swings about the retraction pivot 4 under the influence of the remotely controllable fluid actuated jack 5 having flow and return connections 6 and 7. The jack is connected between the lug 8 on the end cap 9 of the pillar 3 and a fixed anchorage 4A. The end cap 9 carries a peg 10 which projects into a cam slot 11 of a fixed guide plate 12 (which may be duplicated in a lateral sense). A projection 13 on the end of the cap 9 co-operates with a fixed socket 14 to provide a down latch when the unit is fully extended as shown. The straight part at the upper end of the cam slot 11 may also contribute to locking. Assuming the unit to be extended as shown in the drawing, and retraction is required, pressure is applied to the jack plunger through the pipe line 6 to retract the jack 5. During initial jack operation, the end cap 9 is drawn down against the loading spring 15. By the time the projection 13 has disengaged the fixed socket 14 the peg 10 has run out of the straight part of the cam 11 and further retraction of the jack 5 swings the pillar 3 about the retraction pivot 4. The curved part of the cam slot 11 is involute about the retraction pivot and the peg is therefore brought progressively nearer to the retraction pivot 4 as retraction continues, with the result that the loading of the spring 15 is increased throughout retraction movement and is kept available to be expended in extension.

It should be noted that the spring 15 is under compression between the blind end of the cap 9 and the plug 16 fixed within the pillar 3, and is therefore not affected by shock-absorbing and taxiing loads transmitted to the pillar. The resilient suspension for the tail wheel 17 is provided through a lever 18 which swings up and down about the pivot 19 on the lower end bracket 20 forming the foot of a tubular sleeve 21 fitted in the pillar 3. The lever swings up and down under landing and taxiing loads against the resilient resistance of the shock-absorber 22 secured between the pin joint 23 in the sleeve 21 and the pin joint 24 on the lever 18.

Having regard to the fact that in the form shown the retractable unit is a tail-wheel, restrained castoring action is provided. The wheel is intended to be in trail of the pillar and the tubular sleeve 21 is rotatable under castoring influence, relative to the pillar 2 and parts fast to the latter. To provide restraint to the castoring and also a self-centering action, there are aligning cams, of which 25 is axially fixed but is rotatable with the sleeve 21. The cam 25 co-operates with the cam 26 which is fixed relative to the pillar 3, and which is therefore non-rotatable, but the cam 26 is yieldable axially against the influence of the spring 27.

The unit may be secured in the retracted condition by jack pressure alone, in which case for extension it is necessary merely to open the jack line 6 to relief, whereupon the energy stored in the compressed spring 15 causes peg 10 to ride up the cam slot and complete extension operation. No positive "up" latch has been shown, but as such latches are common in this art, any suitable latch may be provided for securing the unit in the retracted condition, if desired; such a latch will normally be manually actuated for release before re-extension can occur.

What I claim is:

1. In a retractable aircraft undercarriage or the like, a pillar rotatable about a fixed pivot, a ground-engaging element supported from said pillar, a cap movable lengthwise of the pillar, cam means engageable by said cap, and so positioned relative to the retractional pivot as to effect such movement of the cap during retraction and extension of the undercarriage, spring means reacting between the cap and the pillar to resist such movement during retraction, and to effect such movement by reaction through the cam, during extension, and jack means to effect rotation of the pillar about the retractional pivot, in opposition to the spring means.

2. In a retractable aircraft undercarriage strut or the like, a pillar rotatable about a fixed pivot, a cap movable lengthwise of the pillar, spring means resisting such movement of the cap in the retracting sense, and being thereby loaded to assist in such movement in the extending sense, jack means operatively connected to the cap, so to load the spring means, and cam means engageable by the cap, and fixed relative to the pivot of retraction, formed and arranged to effect retraction of the strut by and during movement of the cap by the jack in the spring-loading sense, and to effect extension of the strut by and during movement of the cap by the spring means in the opposite sense.

3. In a retractable aircraft undercarriage strut or the like, a pillar rotatable about a fixed pivot, a cap movable lengthwise of the pillar, spring means resisting such movement of the cap in the retracting sense, and being thereby loaded to effect such movement in the extending sense, jack means pivotally connected between a pivot movable with the cap and a fixed pivot offset from the pivot of retraction, the pivot of retraction and the two pivots of the jack thus constituting the apices of a deformable triangle, and a fixed cam operatively engaged by the cap, formed and arranged to effect retracting movement of the strut by and during deformation of the triangle by the jack in the spring-loading sense, and to effect extension of the strut by and during deformation of the triangle by the spring means in the opposite sense.

4. In a retractable undercarriage strut or the like, a pillar rotatable about a fixed pivot, a cap movable lengthwise of the pillar, locking means carried by the cap for engagement with complemental locking means during the final extensional movement of the cap, and releasable by the first movement of the cap in the opposite sense, spring means resisting retractional movement of the cap, and being thereby loaded to effect its extensional movement, jack means pivotally connected between a pivot movable with the cap and a fixed pivot offset from the pivot of retraction, the three pivots thus constituting the apices of a deformable triangle, and a fixed cam operatively engaged by the cap, formed and arranged to effect, in sequence during deformation of the triangle by the jack in the spring-loading sense, first release of said locking means, and second retractional movement of the strut, and to effect the reverse sequence by and during deformation of the triangle in the opposite sense by the spring means.

5. In a retractable undercarriage strut or the like, a pillar rotatable for retraction and extension about a first pivot, a cap guided upon the pillar for movement lengthwise of the pillar a second pivot formed upon the cap, a third pivot fixed relative to and offset from the first pivot, a cam and a cooperating cam follower, the one fixedly positioned and the other carried by the cap, formed and arranged to effect approach of the second and first pivots, and rotation of the whole assembly about the first pivot, upon approach of the second and third pivots, and vice versa, jack means operatively connected to effect such approach of the second and third pivots, and consequent retraction of the assembly, and spring means resisting such retractional movement, and being loaded thereby to assist movement of the assembly in the opposite sense.

6. The combination of claim 5, wherein the cam is formed upon an involute curve about the first pivot.

7. The combination of claim 5, wherein the cam is formed upon an involute curve about the first pivot, and with one terminal extending generally lengthwise of the pillar, to permit final extension of the cap along the pillar, and a lock carried by the cap for engagement with a complemental lock by such final lengthwise movement, thereby to retain the assembly in extended position.

8. In a retractable undercarriage strut or the like, a pillar, a pivot about which the pillar is rotatable for retraction and extension, a member rotatable with and guided upon the pillar for relative lengthwise sliding movement, a cam operatively engaged by said slidable member, said cam being fixedly positioned relative to, and extending angularly about said pivot, one of its ends being radially nearer said pivot than its other end, means interengaged between the pillar and said slidable member to effect approach of the member towards the pivot of retraction, and by reaction through the cam thereby to effect rotation of the assembly into retracted position, and resilient means loaded by such movement, for reaction to effect reverse movement, through the cam, in extending.

9. In a retractable aircraft undercarriage strut or the like, a pillar rotatable for retraction and extension about a fixed pivot, a ground-engaging element supported from said pillar, a cap movable lengthwise of the pillar, spring means reacting between the cap and pillar to urge them apart in all operative positions, cam means engageable by said cap, and so shaped and positioned relative to the retractional pivot as to effect retraction and accompanying continuing increase in the spring loading by approach of the cap and pillar, and by separation of the cap and pillar under the influence of the unloading spring means to effect extension of the undercarriage strut, and jack means to effect approach of the cap and pillar in opposition to the spring means.

10. A retractable undercarriage strut as in claim 9, in which the pillar and cap telescopically interengage, and wherein the spring means is enclosed thereby.

11. A retractable undercarriage strut as in claim 9, in which the spring means is initially loaded in compression.

12. A retractable undercarriage strut as in claim 9, in which a lock element is formed upon the cap, and is arranged for engagement with a complemental lock element by the final extensional movement of the cap, and for disengagement by the initial approach movement of the cap, and wherein the cam means includes a first portion engageable by the cap throughout this portion of the cap's movement, shaped to effect only lock-releasing movement of the cap, and a second portion shaped to effect only retractional and extensional movement of the strut as a whole.

PETER WALTER BURKE.